US010218042B2

(12) United States Patent
Kuhne

(10) Patent No.: US 10,218,042 B2
(45) Date of Patent: Feb. 26, 2019

(54) HEAT DISSIPATING DEVICE FOR AN ELECTROCHEMICAL STORAGE DEVICE

(71) Applicant: Siemens Aktiengesellschaft, Munich (DE)

(72) Inventor: Michael Kuhne, Furth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 625 days.

(21) Appl. No.: 14/759,276

(22) PCT Filed: Dec. 20, 2013

(86) PCT No.: PCT/EP2013/077577
§ 371 (c)(1),
(2) Date: Jul. 6, 2015

(87) PCT Pub. No.: WO2014/108298
PCT Pub. Date: Jul. 17, 2014

(65) Prior Publication Data
US 2015/0357691 A1     Dec. 10, 2015

(30) Foreign Application Priority Data

Jan. 8, 2013   (EP) .................................. 13150506

(51) Int. Cl.
*H01M 2/02* (2006.01)
*H01M 10/39* (2006.01)
(Continued)

(52) U.S. Cl.
CPC ..... *H01M 10/6556* (2015.04); *H01M 2/0237* (2013.01); *H01M 2/0252* (2013.01);
(Continued)

(58) Field of Classification Search
CPC ............. H01M 10/39–10/399; H01M 10/6551
See application file for complete search history.

(56) References Cited

U.S. PATENT DOCUMENTS

| 4,006,281 A | * | 2/1977 | Markin | ............. | H01M 10/3909 |
| | | | | | 141/311 R |
| 4,104,448 A | * | 8/1978 | Gibson | ............. | H01M 10/3909 |
| | | | | | 29/623.2 |

(Continued)

FOREIGN PATENT DOCUMENTS

| EP | 0237828 A2 | 9/1987 |
| JP | 2002134165 A | 5/2002 |
| JP | 2003229103 A | 8/2003 |

OTHER PUBLICATIONS

Okuyama R. et al; "Relationship between the total energy efficiency of a sodium-sulfur battery system and the heat dissipation of the battery case"; Journal of Power Sources, Elsevier SA; Bd. 77; Nr. 2; pp. 164-169; ISSN: 0378-7753; DOI: 10.1016/S0378-7753(98)00190-6; XP004158415; 1999; CH; Feb. 1, 1999.

*Primary Examiner* — Maria Laios
*Assistant Examiner* — Robert S Carrico
(74) *Attorney, Agent, or Firm* — Beusse Wolter Sanks & Maire

(57) ABSTRACT

A system having an electrochemical storage device is provided including an anode chamber filled with anode material and cathode chamber filled with cathode material. The anode chamber is separated from the cathode chamber by ion-conducting solid body electrolytes. The anode chamber is defined on one side by the solid body electrolytes, and on the other side by a wall surrounding the solid body electrolytes. The device has a head part to receive and/or supply electric energy, base part arranged opposite the head part and at least one lateral part having at least one wall between the head and base part. At least one heat dissipating device receives (Continued)

heat from the electrochemical storage device via a first surface and/or to supply heat thereto and to supply and/or receive heat via a second surface. A receiving section is in thermal contact with the heat dissipating device.

18 Claims, 3 Drawing Sheets

(51) Int. Cl.
*H01M 10/64* (2014.01)
*H01M 10/65* (2014.01)
*H01M 10/613* (2014.01)
*H01M 10/656* (2014.01)
*H01M 10/6551* (2014.01)
*H01M 10/6554* (2014.01)
*H01M 10/6556* (2014.01)

(52) U.S. Cl.
CPC ..... *H01M 10/3909* (2013.01); *H01M 10/613* (2015.04); *H01M 10/64* (2015.04); *H01M 10/65* (2015.04); *H01M 10/656* (2015.04); *H01M 10/6551* (2015.04); *H01M 10/6554* (2015.04); *Y10T 29/4911* (2015.01)

(56) References Cited

U.S. PATENT DOCUMENTS

| | | | |
|---|---|---|---|
| 4,189,530 A | | 2/1980 | Boyd |
| 5,879,833 A | * | 3/1999 | Yoshii ................ H01M 2/1088 429/148 |
| 2002/0125860 A1 | * | 9/2002 | Schworm ............. H01M 2/105 320/150 |
| 2008/0145746 A1 | * | 6/2008 | Zappi ................. H01M 2/1646 429/51 |
| 2012/0077070 A1 | * | 3/2012 | Soloveichik .......... H01M 10/26 429/129 |

* cited by examiner

HEAT DISSIPATING DEVICE FOR AN ELECTROCHEMICAL STORAGE DEVICE

CROSS REFERENCE TO RELATED APPLICATIONS

This application is the US National Stage of International Application No. PCT/EP2013/077577 filed 20 Dec. 2013, and claims the benefit thereof. The International Application claims the benefit of European Application No. EP13150506 filed 8 Jan. 2013. All of the applications are incorporated by reference herein in their entirety.

FIELD OF INVENTION

The present invention relates to a system comprising an electrochemical storage device which, when operating normally, comprises an anode compartment filled with an anode material and a cathode compartment filled with a cathode material, wherein the anode compartment is separated from the cathode compartment by an ion conducting solid electrolyte, wherein the anode compartment is defined on one side at least in part by the solid electrolyte, and on another side at least in part by a wall at least partially surrounding the solid electrolyte, and wherein the electrochemical storage device comprises a top part, at which electrical energy may be supplied or conducted away, a bottom part arranged opposite the top part, and at least one side part comprising the at least one wall and arranged between top part and bottom part.

The invention further relates to a heat dissipating device for use in such a system, a thermal module, which comprises multiple such systems electrically interconnected, and a method for producing such a system.

BACKGROUND OF INVENTION

Electrochemical storage devices according to the present invention are storage devices operated at high temperatures, which have an operating temperature level of at least 100° C. In particular, such electrochemical storage devices have an operating temperature level of between 200° C. and 350° C. Operating temperatures of up to 500° C. are however also feasible. Such electrochemical storage devices are embodied in particular using sodium-nickel chloride cell ($NaNiCl_2$ cell) technology or are sodium-sulfur cells (NaS cells).

When operating such electrochemical storage devices, it is necessary to dissipate the heat arising during electrical charging or discharging. At the same time it is necessary to ensure that the electrochemical storage device may be kept at the operating temperature level during operation, since only at such temperatures does the solid electrolyte have an ion conductivity suitable for operation and can the storage device remain free from harmful thermal stresses. The operating temperature level thus sometimes also decisively determines the electrical behavior of the electrochemical storage device.

To establish a suitable operating temperature level, such electrochemical storage devices are generally brought into external thermal contact with a heat transfer medium, such that heat can be suitably supplied or dissipated. Heat supply and/or dissipation may here be undertaken by a sensor assisted heat management system, which ensures that a suitable operating temperature range can always be maintained. In the event of exposure of the electrochemical storage device to relatively high current densities or in the event of higher current density current consumption, an increased amount of heat is formed compared with the normal charging or discharging process. To dissipate this heat efficiently during operation of the electrochemical storage device, it is usual to provide a current density limit, which may also be suitably adjusted depending on the state of charge or discharge of the cell. To a limited extent, it is even briefly also possible to allow current densities elevated beyond this limit during charge or discharge, insofar as the amount of heat generated in the process is sufficiently low in relation to the thermal capacity of the electrochemical storage device.

However, the use of such electrochemical storage devices in particular for mobile applications increasingly requires design for elevated power densities. Even for stationary applications for intermediate storage of electrical energy for instance from a power supply network these requirements are also significantly increased. Such requirements may also present a major challenge to the heat management system, which has to ensure cooling of the electrochemical storage device.

To be able efficiently to dissipate the heat released in the electrochemical storage device during such operation, the applicant has proposed in a parallel application to make the spacing between the solid electrolyte and the wall surrounding it so small that even in the event of a low electrochemical storage device charge this space determined by the spacing is completely filled with anode material. As a result of this filling it is possible for the electrochemical storage device to influence the released heat very positively by direct heat outflow via the anode material to the outside at the side part of the electrochemical storage device. By way of example, in such an electrochemical storage device the cell can comprising the side part may be of tapered construction, wherein the ceramic solid electrolyte is wetted completely by anode material due to the small spacing between the wall of the can and the surface thereof even in the case of a low state of charge. As a result of this geometry, a uniform temperature distribution around the solid electrolyte may at the same time be achieved, which in turn results in a reduction in mechanical stresses in the solid electrolyte. This extends the service life of the solid electrolyte and thus of the entire electrochemical storage device.

If for example such electrochemical storage devices are operated at an elevated power density, an elevated amount of waste heat also arises, which has typically to be dissipated outwards via the side part (dissipation via the top part or the bottom part is however in principle also feasible). The elevated operating temperature in the electrochemical storage devices also accelerates the reaction rates of undesired chemical reactions within the storage device. Such chemical reactions are for example liable to reduce the capacity of the cathode or promote corrosion and degradation phenomena of the electrodes and walls. In this respect, it is necessary for undisturbed operation to dissipate this sometimes large amount of heat sufficiently quickly from the storage device to reduce such influences which for instance shorten the service life of the storage device.

SUMMARY OF INVENTION

An object of the present invention is accordingly to propose an electrochemical storage device which avoids the disadvantages known from the prior art. In particular, the electrochemical storage device is intended to be in a position also to operate at relatively high power densities, wherein the waste heat released in the process can be dissipated outwards sufficiently quickly.

It is furthermore intended that such an electrochemical storage device should be suitable for use in a thermal module for storage and release of electrical energy. It is likewise an object of the present invention to propose a method for producing such an electrochemical storage device.

In particular, it is intended that the present invention also enable efficient heat dissipation with the assistance of further means, wherein the electrochemical storage device, as described above, may be adapted in terms of design for improved wetting of the solid electrolyte even in the case of a low state of charge.

According aspects of to the invention, these objects are achieved by a system and a heat dissipating device, a thermal module and a method for producing such a system as claimed.

In particular, these objects of the invention are achieved by a system comprising an electrochemical storage device which, when operating normally, comprises an anode compartment filled with an anode material and a cathode compartment filled with a cathode material, wherein the anode compartment is separated from the cathode compartment by an ion conducting solid electrolyte, wherein the anode compartment is defined on one side at least in part by the solid electrolyte, and on another side at least in part by a wall at least partially surrounding the solid electrolyte, and wherein the electrochemical storage device comprises a top part, at which electrical energy may be supplied or conducted away, a bottom part arranged opposite the top part, and at least one side part comprising the at least one wall and arranged between top part and bottom part, and wherein the system further comprises at least one heat dissipating device, which is configured to receive heat from the electrochemical storage device (or release it thereto) via a first surface and release it via a second surface (or receive heat via said second surface) and wherein the electrochemical storage device comprises a receiving portion which is configured to be brought into, or be in, thermal contact with the heat dissipating device.

In addition, the objects underlying the invention are achieved by a heat dissipating device for use in such a system as described both above and below.

Likewise, the objects underlying the invention are achieved by a thermal module for storing and releasing electrical energy, comprising multiple electrically interconnected systems as described above and below, wherein the systems are surrounded by a heat transfer medium for heat transfer purposes.

Likewise, the objects underlying the invention are achieved by a method for producing such a system described both above and below, which comprises the following step:—bringing the electrochemical storage device into thermal contact with the heat dissipating device at a receiving portion.

At this point it should be noted that the anode material filling in the anode compartment is already present during normal operation. As is known for example from sodium-nickel chloride cell technology, it may however also be the case that prior to initial charging of the electrochemical storage device no anode material is as yet present in the anode compartment. Only through the initial charging process does the anode material move at least partially out of the cathode compartment into the anode compartment.

It should further be noted that the thermal contact between electrochemical storage device and heat dissipating device may already exist or be produced. Thermal contact should in particular be understood to be direct contact, with which direct heat conduction may take place. It is likewise possible for thermal contact to be imparted by heat transfer media, which are provided between heat dissipating device and electrochemical storage device.

According to an embodiment, it is possible for one or even multiple heat dissipating devices to be provided per electrochemical storage device.

It should furthermore be noted that the top part, bottom part and/or side part of the electrochemical storage device may be made from separate workpieces. It is alternatively also possible for these parts to comprise just one workpiece, which has been suitably shaped, for example, to form the respective parts. By way of example, the side part and the bottom part may be made from one workpiece, which is for example can-shaped.

According to aspects of the invention, in addition to an electrochemical storage device a heat dissipating device is provided in the system which may receive heat arising in the storage device via a first surface and release it via a second surface. In this respect, the electrochemical storage device has a receiving portion provided for thermal contacting, via which the heat may be transferred to the first surface of the heat dissipating device. The receiving portion is then configured to receive the heat dissipating device.

As a result of this embodiment, heat may be particularly efficiently removed from the electrochemical storage device. In particular, the receiving portion may be suitably shaped to encourage the formation of thermal contact, such that the thermal resistance between electrochemical storage device and heat dissipating device is suitably low. It is thus possible for heat sometimes to be dissipated at a higher heat dissipation rate than a normally configured electrochemical storage device, whereby the electrochemical storage device may be more efficiently cooled and thus may also have an extended service life. This is particularly significant since the service life of an electrochemical storage device particularly in the event of elevated and/or alternating electrical load is primarily determined by the service life of the solid electrolyte, which may be easily damaged by thermal stresses.

As a result of heat dissipation achieved by means of the heat dissipating device, it is possible to achieve more targeted, more efficient heat dissipation compared with an electrochemical storage device without heat dissipating device. In this way, the electrochemical storage device may be operated either at higher current densities, wherein the thermal load remains unchanged, or indeed also with the same electrical power with reduction of thermal load. Both exhibit a positive effect with regard to extension of the service life of such an electrochemical storage device. In addition, the invention makes it possible to dissipate heat in particular in a locally targeted manner at the location where it is generated to an increased degree in the electrochemical storage device. Through a suitable geometric selection of the arrangement of the receiving portion, it is thus additionally possible to influence heat dissipation in a targeted manner.

According to a particular embodiment of the system according to the invention, provision is made for the electrochemical storage device to be embodied as a sodium-nickel chloride cell ($NaNiCl_2$ cell), or as a sodium-iron-chloride cell ($NaFeCl_2$ cell) or as a mixture of these cells or as a sodium-sulfur cell. The abovementioned forms of cell technology require efficient dissipation of the waste heat from the electrochemical storage devices and are thus particularly suited to being cooled efficiently by the present invention.

In accordance with a further embodiment of the system according to the invention, the receiving portion is arranged at the wall. The wall is in turn comprised by the side part. Conventional electrochemical storage devices have a side part of significantly larger surface area than the top part or bottom part, such that heat may be dissipated from this region particularly efficiently. In addition, in the electrochemical storage device the wall is located relatively close to the solid electrolyte and can thus dissipate heat therefrom particularly efficiently.

According to a further embodiment of the system according to the invention, the first surface of the heat dissipating device may be connected at least in part with an exact fit and/or without a break in the surface with the receiving portion of the electrochemical storage device. In particular, the entire first surface may be connected with an exact fit and/or without a break in the surface. The exact fit or lack of a break in the surface here ensures very good thermal contact by direct mechanical contact. According to the embodiment, the connection between heat dissipating device and electrochemical storage device can be undone. The connection is in particular sufficiently resistant to normal mechanical stress that it cannot be undesirably undone during conventional operation. Due to the exact fit or lack of break in the surface, it is additionally also possible to dissipate heat from given portions of the electrochemical storage device in targeted manner through a suitably shaped receiving portion as contact region.

In accordance with a particular embodiment of the system according to the invention, provision is made for the receiving portion to take the form of a depression and/or recess and/or shaping, in particular of the wall. A receiving portion of this type allows particularly favorable connection between heat dissipating device and electrochemical storage device, since the two may be connected together by means of suitably shaped mating regions, to form a thermal contact. Such receiving portions additionally in turn allow targeted heat dissipation at particularly thermally loaded regions of the electrochemical storage device. In addition, such receiving portions may also impart a mechanically strong connection.

It is moreover possible for the heat dissipating device to be configured to be separable from the electrochemical storage device. Separable should here in particular also be understood to mean removable. In this respect, reversible separation is provided in particular when the two parts are not damaged by the separation such that their functionality and reconnection would be impaired thereby. The separability in particular allows great flexibility when interconnecting such systems to form a thermal module, as well as ensuring that individual parts can be quickly replaced in the event of fatigue or failure. This is highly significant in particular for the maintainability of such a system or of such a thermal module.

In accordance with a further particularly advantageous embodiment of the invention, provision is made for the first surface of the heat dissipating device to be smaller than the second surface. In this respect, the first surface may in particular be fully in thermal contact with the electrochemical storage device. Due to the different size ratios between first surface and second surface, the amount of heat received via the first surface may be distributed over a larger second surface and thus released more efficiently. Since the second surface is typically wholly available for heat release when the electrochemical storage device is in operation, there is here a suitably positive area ratio to dissipate even relatively large amounts of heat over short periods of time.

According to a further aspect of the system according to the invention, provision may be made for the receiving portion to be shaped such that on thermal contact of the heat dissipating device with the electrochemical storage device an integrated overall shape of the system results, wherein a first portion of the overall shape is determined by the heat dissipating device and a second portion of the overall shape is determined by the electrochemical storage device. The two portions thus add together to form an integrated overall shape. The overall shape here relates in particular to the surfaces of the system according to the embodiment pointing outwards towards a possible user. An overall shape is here in particular integrated if the portions merge substantially continuously with one another, i.e. the transitional areas are smooth, i.e. differentiable in a mathematical sense. With this transition, however, gaps between the individual system components need no longer be taken into account. The overall shape may in particular be approximately a cuboid, a body of revolution, for example a cylinder, or indeed bar-shaped with any desired basic shape. The latter basic shape may for example be a triangle or indeed quadrilateral, hexagonal or circular. Furthermore, the overall shape may comprise an axis of symmetry, whereby the system likewise has this axis of symmetry. In particular when interconnecting such a system according to the embodiment in a thermal module, the system may be easily installed as an integrated component. System cooling also proceeds advantageously in such a thermal module, since for example a flow experiences the system substantially merely as a single body with a uniform flow resistance and not as two separate flow resistances.

In addition, the overall shape may be configured such that it corresponds substantially to the overall shape of conventional electrochemical storage devices, whereby these two electrochemical storage devices may be installed together for example in a thermal module, without special precautions having to be taken for one embodiment.

According to a further advantageous embodiment of the invention, provision is made for the receiving portion to be arranged closer to the bottom part than to the top part. This proves advantageous in particular in electrochemical storage devices which operate on the basis of sodium-nickel chloride cell or sodium-sulfur cell technology. It is evident here that in normal operation more heat arises in particular in the vicinity of the bottom part, so meaning that more heat also has to be dissipated therefrom for efficient heat dissipation. In particular, such storage devices are also in a position, even in different states of charge, to dissipate the heat from the electrochemical storage device to the outside at the bottom part via direct heat conducting contact via the anode material located in the anode compartment.

According to a further advantageous embodiment of the invention, provision is made for the receiving portion to comprise at most 80%, in particular at most 65% of the overall surface of the electrochemical storage device. In particular, the receiving portion comprises at least 40%, in particular at least 55% of the overall surface of the electrochemical storage device. It is accordingly therefore possible to dissipate heat from the electrochemical storage device efficiently even when only a receiving portion area smaller than the overall surface is available.

According to another embodiment of the invention, the heat dissipating device comprises at least one shaped region, which is configured to guide a heat transfer medium flowing past the system fluid-dynamically in a preferential direction on thermal contact between electrochemical storage device and heat dissipating device. The at least one shaped region may also take the form of a baffle. This fluid dynamic effect in particular enables favorable flow control of a heat transfer medium in a thermal module in which such a system according to the embodiment is installed. In particular, therefore, it is intended to influence favorably the flow behavior of the heat transfer medium, such that for instance a pump means moving the heat transfer medium has less work to do, or the heat can be brought more quickly to a different place. In other words, flow resistance may be reduced by suitable flow control. The heat transfer medium in such a thermal module may here be for example air or indeed a liquid such as for instance heat transfer oil or silicone oil.

In accordance with an extension of this idea, provision is made for the shaped region to comprise a baffle, which in particular takes the form of an air baffle. Such a component likewise enables particularly efficient flow control.

According to a further extension, provision is also made for the shaped region to comprise a surface portion on which a heat transfer medium flowing past the system may act with fluid-dynamic turbulence. Such turbulence may sometimes have improved heat dissipation as a consequence. In this respect, it is possible to achieve a higher heat transfer rate between the second surface of the heat dissipating device and the heat transfer medium. In particular, the turbulence should only be generated locally, such that the overall flow behavior of the heat transfer medium in the thermal module is not influenced in a way that is significantly disadvantageous.

Furthermore, it is feasible for the heat dissipating device to comprise an electrically insulating material. The electrically insulating material is here in particular comprised by the second surface of the heat dissipating device. In this respect, it is possible to prevent an electrical short circuit with another system on contact therewith via the second surface, for instance in a thermal module. In particular, the arrangement of the insulating material points towards the outside of the system, i.e. for instance away from the side part of the electrochemical storage device. Alternatively, however, it is also possible for the insulating material to be comprised by the first surface and thus for instance to be directed towards the electrochemical storage device on thermal contact between electrochemical storage device and heat dissipating device. Thus, the electrochemical storage device may also be brought in electrically insulating manner into contact with other systems and/or electrochemical storage devices. Such a solution according to the embodiment is particularly advantageous when the electrochemical storage device has a side part or a top and/or bottom part which is electrically conductive. This is the case in particular with sodium-nickel chloride cell technology.

It has moreover proven advantageous for the heat dissipating device to be made of a solid material. Metal should in particular be mentioned here, this being a solid material with a particularly preferred thermal conductivity. This thermal conductivity may in particular be improved in comparison with the thermal conductivity for instance of the wall of the electrochemical storage device. In an extension of the concept, this may also be applied to the thermal conductivity of the top part, of the bottom part and/or of the side part of the electrochemical storage device.

In accordance with a first embodiment of the thermal module according to the invention, provision may be made for the heat dissipating device of the electrically interconnected systems at the same time to fulfill a support function. The heat dissipating device thus takes the form of a support. This reduces significantly the material required and effort involved in assembling a thermal module. At the same time, the systems held by the thermal module may be mounted in a safe and operationally appropriate manner.

The invention will be described in detail below with reference to various figures. It should be pointed out here that the figures should be understood merely schematically and do not in any way restrict the practicability of the invention.

All the features provided with the same reference numerals in the figures have a uniform technical effect.

It should moreover be pointed out that the individual features shown in the figures listed below are claimed alone and in any desired combination of said features, insofar as such a combination is covered by the present inventive concept.

DETAILED DESCRIPTION OF INVENTION

Figure 1:
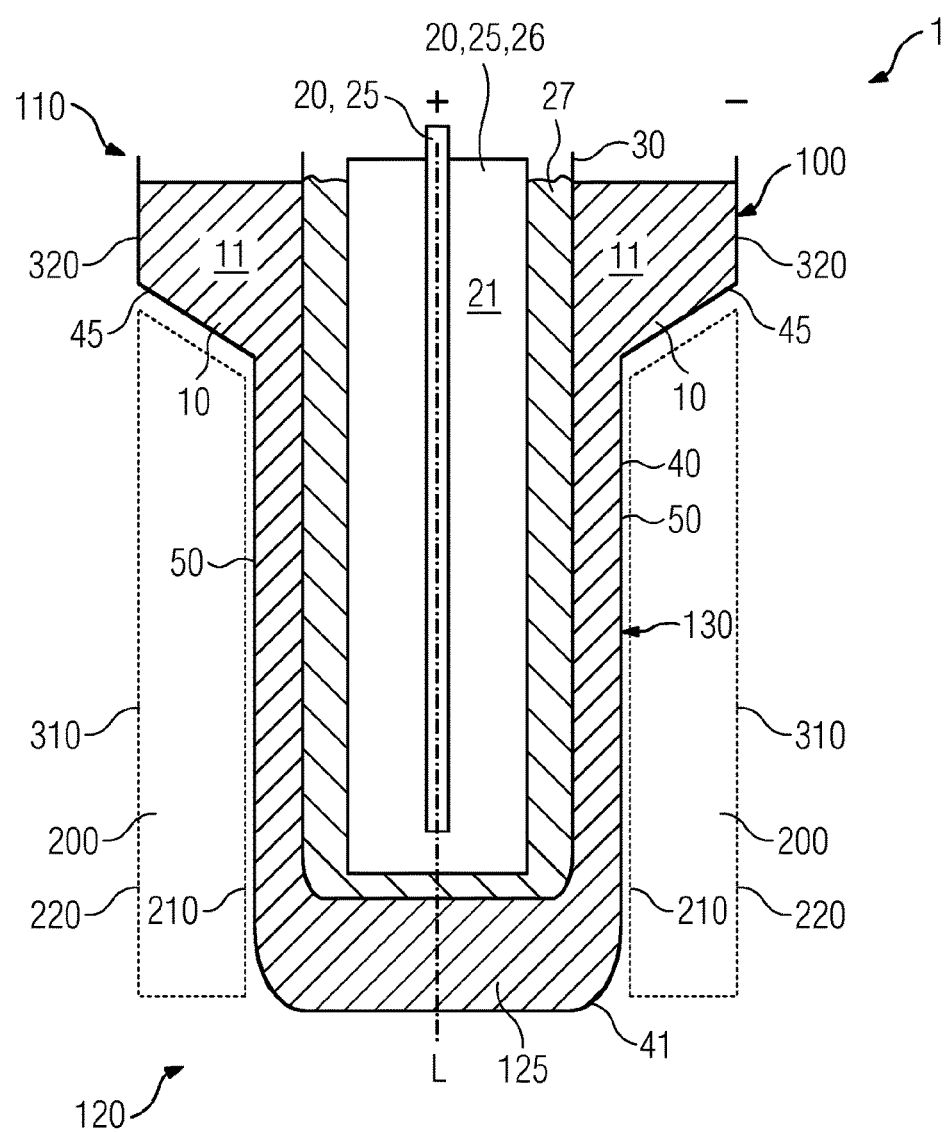
FIG. 1 is a schematic representation of a first embodiment of the system according to the invention in lateral sectional view through the axis L of longitudinal extension of the electrochemical storage device.

FIG. 1 shows an embodiment of the system 1 according to the invention in schematic lateral sectional view parallel to the central axis L of longitudinal extension. In addition to an electrochemical storage device 100, the system 1 comprises a heat dissipating device 200, which is respectively arranged laterally in the sectional view shown according to the present orientation. The electrochemical storage device 100 comprises an anode compartment 11 filled with an anode material 10, which is offset from a cathode compartment 21 by a solid electrolyte 30. The cathode compartment 21 is filled with cathode material 20.

If the electrochemical storage device 100 is embodied using sodium-nickel chloride cell technology, the cathode material 20 is formed for instance by a metallic cathode 25 (for example of nickel), by a cathode salt 26 and a cathode electrolyte 27 in liquid form at operating temperature. The anode material 10 is liquid sodium at operating temperature. The solid electrolyte 30 is typically in the form of a ceramic. Suitable ceramic materials are for instance $\beta$—$Al_2O_3$ or $\beta''$—$Al_2O_3$. As is known from the prior art, on charging of the resultant electrochemical storage device 100 sodium is transported in ionic form by the solid electrolyte from the cathode compartment 21 to the anode compartment 11, where these ions accumulate as metallic sodium after reduction. On discharge this transport is reversed, wherein the sodium located in the anode compartment 11 reduces to an increasing extent and thereby the liquid sodium fill level in the anode compartment 11 falls.

To improve heat dissipation from the electrochemical storage device 100, the electrochemical storage device may be configured such that merely a relatively small distance is present between the solid electrolyte 30 and the wall 40 comprised by the side part 130 of the electrochemical storage device. If the anode compartment 11 is already filled with sufficient sodium in liquid form in a low state of charge, the fill level rises relatively quickly and increasingly or completely wets the surface of the solid electrolyte 30 facing the wall 40. To dissipate heat, the liquid sodium located in this region is available as a direct heat conductor, whereby the heat may be dissipated particularly efficiently out of the electrochemical storage device.

Since these measures for heat dissipation may require a shape of electrochemical storage device 100 other than the conventional shape, insufficiently good heat dissipation may arise for example in regions of the surface of the electrochemical storage device 100, since the heat releasing surfaces are relatively small, or insufficiently good heat dissipation may be obtainable as a result of the heat transfer medium used for heat dissipation. To avoid these disadvantages, a heat dissipating device 200 is provided according to the invention which is in thermal contact with the electrochemical storage device 100 via a receiving portion 50 thereof. The heat dissipating device 200 here comprises surfaces 210 and 220 provided for heat transfer. The first surface 210 is configured to receive heat from the electrochemical storage device 100 via the receiving portion 50, and to release this heat again via the second surface 220 after heat conduction through the heat dissipating device 200 to the second surface 220. Heat release may be further improved significantly if at least one suitably shaped region is provided on the second surface, which region further enlarges the second surface. This heat release effect may in particular be improved if the region shaped in this way takes the form of a cooling fin or of cooling fins.

In the present case, the electrochemical storage device 100 is configured by shaping the side part 130 such that the electrochemical storage device 100 is tapered towards the bottom part 120. While the bottom part 120 thus comprises a tapered circumferential surface and in particular largely follows the contour of the solid electrolyte 30, the top part 110 of the electrochemical storage device 100 has a relatively more uniform and/or larger circumferential surface, which may also enclose the anode compartment 11.

According to the embodiment, the shaping 45 is arranged between top part 110 and bottom part 120. According to the embodiment, the side part 130 and the bottom part 120 are encompassed by a can 41. The top part 110 (here shown in as yet unsealed form) may in part also encompass this side part 130 or comprise a closing plate, not disclosed in any greater detail.

Electrical energy may be supplied and/or conducted away via the top part 110.

According to the embodiment, the receiving portion 50 of the electrochemical storage device 100 is arranged at the wall 40. Here, the first surface 210 of the heat dissipating device 200 is in thermal contact with this receiving portion 50 substantially with an exact fit and/or without a break in the surface. A dissipating device 200 and the electrochemical storage device 100 are in particular of separable construction.

The first surface 210 of the heat dissipating device 200 here has a smaller area than the second surface 220. The second surface 220 may additionally also have a still further enlarged surface area created by suitably shaped regions, in particular in the form of one or more cooling fins, which may also at the same time assume the function of a fluid guiding surface. Thus the heat dissipating device 200 may advantageously dissipate the heat through heat conduction to the second surface 220 and then release it to the outside via a larger area.

The receiving portion 50 is in the present case shaped such that the electrochemical storage device 100 together with the heat dissipating device 200 in thermal contact forms an integrated overall shape of the system 1. In this respect, a first portion 310 of the heat dissipating device 200 is present, in the present case substantially identical with the second surface 220, which determines one part of the overall shape of the system 1. A second portion 320 of this overall shape is determined by the electrochemical storage device 100. According to the embodiment, this second portion 320 is arranged closer to the top part 110 of the electrochemical storage device 100. According to the embodiment, the system 1 comprises an integrated overall shape or overall surface, such that in particular when a heat transfer medium (not shown here) is flowing round the system 1 relatively low flow resistance may be established. The flow is substantially exposed to an integrated overall surface as flow resistance. This applies in particular for flow which is directed from the bottom part 120 towards the top part 110.

Figure 2:
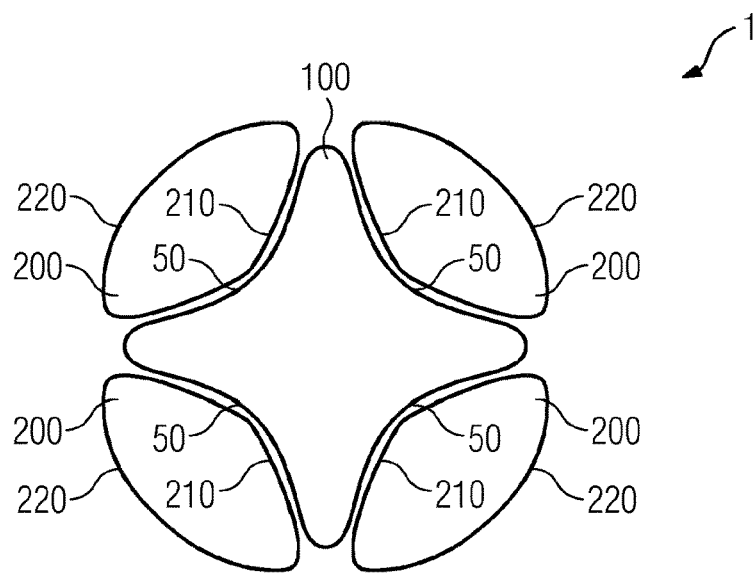
FIG. 2 is a cross-sectional view through an embodiment of the system according to the invention perpendicular to the axis L of longitudinal extension of the electrochemical storage device.

FIG. 2 shows a schematic representation of a cross-sectional view in section perpendicular to the axis L of longitudinal extension of an electrochemical storage device 100, as shown for example in FIG. 1. Here the cross section is taken close to the bottom part 120. The cross-sectional view shows the relative arrangement of electrochemical storage device 100 to heat dissipating device 200. The heat dissipating device 200 is embodied in multiple (four) pieces in cross section, wherein the pieces may be connected together close to the shaping 45. It is likewise feasible to embody the heat dissipating device 200 in one piece even in the region of the cross section. The heat dissipating device 200 may likewise also be embodied in multiple pieces, which may be held together for instance by a further connecting device, not shown. Electrochemical storage device 100 and heat dissipating device 200 are in thermal contact via the receiving portion 50 and the first surface 210. On the release of heat from the system 1 a flow of heat is guided from the electrochemical storage device 100 to the second surface 220 of the heat dissipating device 200 and then dissipated. The second surface 220 may, as already stated above, additionally also have a still further enlarged surface area created by suitably shaped regions, in particular in the form of one or more cooling fins, which may also at the same time assume the function of a fluid guide surface.

Figure 3:
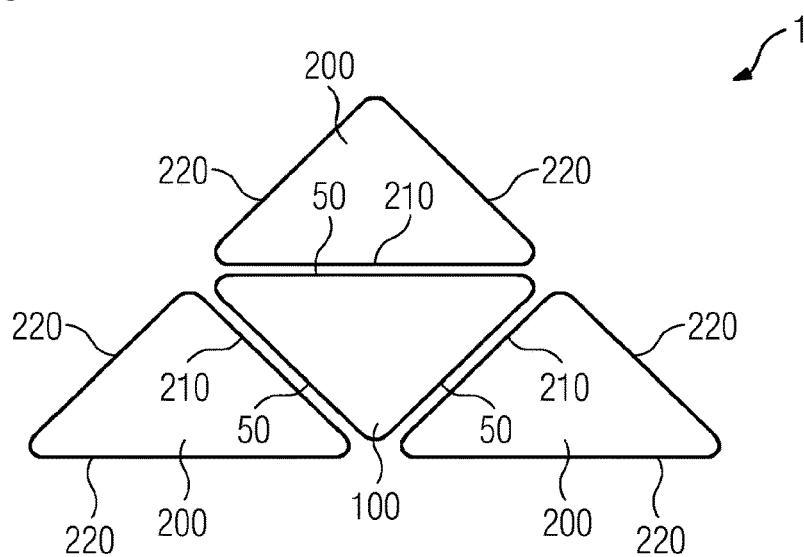
FIG. 3 is a cross-sectional view through an embodiment of the system according to the invention perpendicular to the axis L of longitudinal extension of the electrochemical storage device.

FIG. 3 shows a further possible embodiment of a cross-sectional view perpendicular to an axis L of longitudinal extension, not shown in any greater detail, of a system 1 with electrochemical storage device 100. Here the heat dissipating device 200 is shown, as in the embodiment according to FIG. 2, as being in multiple pieces, three pieces in total, wherein the individual pieces have a triangular basic shape in the divided cross-sectional view.

Figure 4:
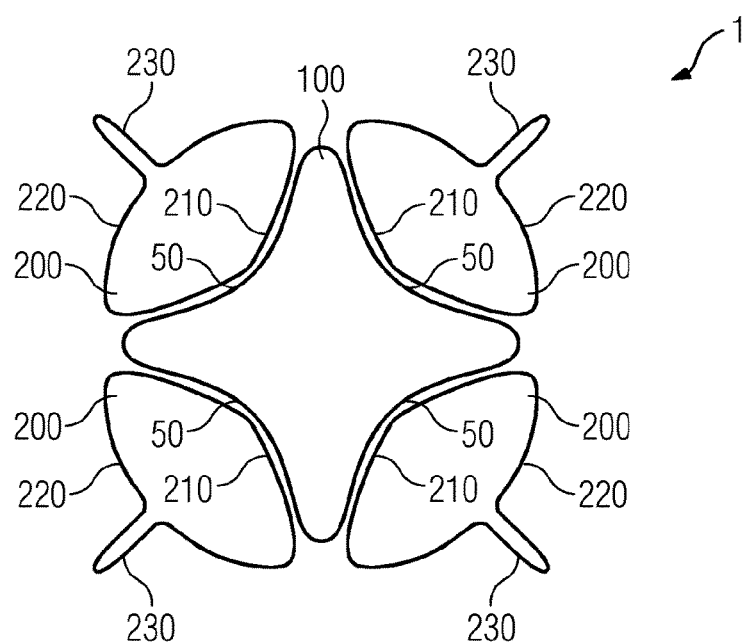
FIG. 4 is a cross-sectional view through an embodiment of the system according to the invention perpendicular to the axis L of longitudinal extension of the electrochemical storage device.

FIG. 4 shows a further view in cross section across an axis L of longitudinal extension (not shown in any greater detail) of one embodiment of the electrochemical storage device 100. Here once again the electrochemical storage device 100 and the heat dissipating device 200 are in thermal contact. The system 1 comprises a substantially comparable cross-sectional shape to the embodiment shown in FIG. 2. The outwardly pointing second surfaces 220 of the heat dissipating device 200 however centrally each comprise a shaped region 230, which takes the form of a flow guide surface. The shaped region 230 is suitable in particular for advantageously guiding a flow (in the present orientation out of the image plane or into the image plane). This causes reduced turbulence in the vicinity of the second surface 220, whereby the flow of the heat transfer medium flowing past may be more uniform and homogeneous.

Figure 5:
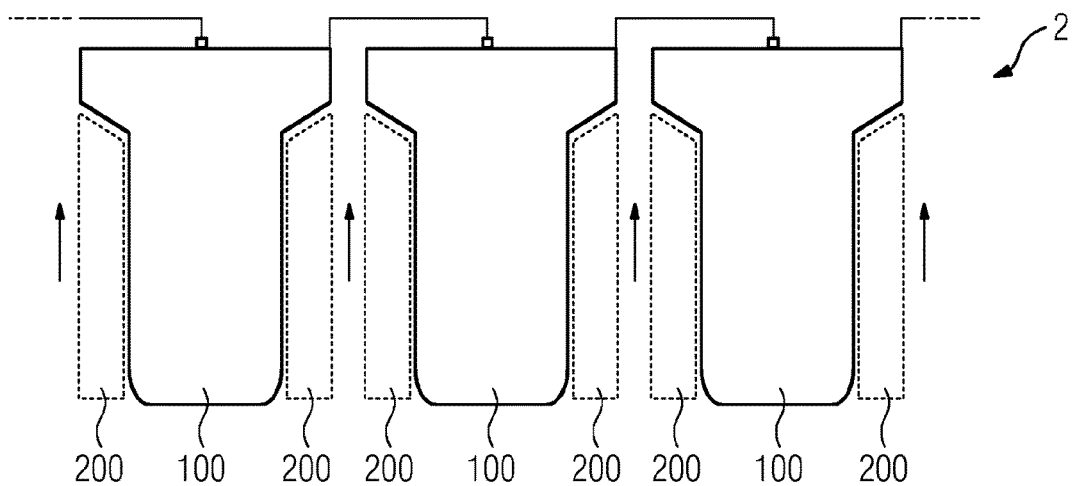
FIG. 5 is a schematic lateral sectional view of a first embodiment of the thermal module for storing and releasing electrical energy.

FIG. 5 shows a schematic representation in lateral sectional view of a thermal module 2, which comprises multiple electrically interconnected systems 1, around which a suitable heat transfer medium (indicated by the upwardly pointing arrows) flows for the purpose of heat transfer. Here the individual systems 1 are configured substantially like the system 1 shown in FIG. 1. The heat dissipating devices 200 may here also be suitably configured as supports, such that the electrochemical storage device 100 is suitably held or supported thereby.

At this point it should again be pointed out that the dimensions (overall shape or overall surface) of the system 1 may substantially correspond to those of conventional electrochemical storage devices not configured according to the invention. In this respect, the packing density on introduction of a system 1 into such a thermal module 2 instead of conventional electrochemical storage devices may be substantially maintained. This is thus the case despite introduction of the additional heat transfer devices 200.

According to a particular embodiment of the thermal module 2, the heat transfer medium may take the form of air, which may flow around the systems 1 in any desired direction to cool them. According to the embodiment, it is also possible to guide the heat transfer medium in the thermal module 2, through suitable design or the combination of differently shaped heat dissipating devices 200, in such a way that said medium flows in a targeted manner within the thermal module. In this case, various combinations with and without shaped regions 230 or suitable baffles are also feasible.

It is likewise feasible according to the embodiment to achieve a comparable effect for liquid heat transfer media by suitable shaping or combinations of differently shaped regions 230.

In general, the heat transfer medium may be gaseous and liquid. A combination of the two may likewise be feasible. An advantageous gaseous heat transfer medium is air; advantageous liquid heat transfer media are heat transfer oil or silicone oil.

If the side parts 130 of the electrochemical storage devices 200 interconnected electrically in the thermal module 2 are electrically conductive (this is the norm for instance in the case of sodium-nickel chloride cells), electrical insulation of various systems 1 may be achieved by providing an electrically insulating layer for instance at the outer edges of adjacent heat dissipating devices 200 or at the side parts 130, so that the latter may be constructed in the vicinity of one another without the risk of an electrical short circuit between the individual electrochemical storage devices 100 or systems 1. In this respect, the heat dissipating device 200 may have a larger structural width, such that the first portion 310 or the second surface 220 of the heat dissipating device 200 is further away from the axis L of longitudinal extension of the electrochemical storage device 100 than for example the second portion 320.

For improved electrical insulation it is also possible for the heat dissipating device 200 to comprise an electrically insulating inner layer on the first surface 210.

A person skilled in the art may undertake suitable combinations of different heat dissipating devices 200, as described above, in order to achieve flow guides suitable for heat management.

Further embodiments are revealed by the subclaims.

The invention claimed is:

1. A system comprising:
an electrochemical storage device which, when operating normally, comprises an anode compartment filled with an anode material and a cathode compartment filled with a cathode material, wherein the anode compartment is separated from the cathode compartment by an ion conducting solid electrolyte, wherein the anode compartment is defined on one side at least in part by the solid electrolyte, and on another side at least in part by a wall at least partially surrounding the solid electrolyte, and
wherein the electrochemical storage device comprises a top part, at which electrical energy may be supplied or conducted away, a bottom part arranged opposite the top part, and at least one side part comprising the wall and arranged between top part and bottom part, and
wherein the system further comprises at least one heat dissipating device, configured to be separable from the electrochemical storage device and to receive heat from the electrochemical storage device via a first surface and to release the heat via a second surface,
wherein the electrochemical storage device further comprises a receiving portion, configured to be brought into thermal contact with the heat dissipating device,
wherein the first surface of the heat dissipating device is adapted to be connected at least in part with the receiving portion of the electrochemical storage device,
wherein the top part has a larger circumferential surface than the bottom part and the side part comprises a shaped region such that the electrochemical storage device is tapered from the top part towards the bottom part and the electrochemical storage device is removably supported at the shaped region by the heat dissipating device, and
wherein an uppermost surface of the heat dissipating device contacts the shaped region.

2. The system as claimed in claim 1,
wherein the electrochemical storage device is embodied as an $NaNiCl_2$ cell, or as an $NaFeCl_2$ cell or as a mixture of these cells.

3. The system as claimed in claim 1,
wherein the receiving portion is arranged at the wall.

4. The system as claimed in claim 1,
wherein the receiving portion takes the form of a depression and/or recess and/or shaping, of the wall.

5. The system as claimed in claim 1,
wherein the first surface of the heat dissipating device is smaller than the second surface.

6. The system as claimed in claim 1,
wherein the receiving portion is shaped such that on thermal contact of the heat dissipating device with the electrochemical storage device an integrated overall shape of the system results,
wherein a first portion of the overall shape is determined by the heat dissipating device and a second portion of the overall shape is determined by the electrochemical storage device.

7. The system as claimed in claim 1,
wherein the receiving portion is arranged closer to the bottom part than to the top part.

8. The system as claimed in claim 1,
wherein the heat dissipating device comprises at least one shaped region, configured to guide a heat transfer medium flowing past the system fluid-dynamically in a preferential direction on thermal contact between electrochemical storage device and heat dissipating device.

9. The system as claimed in claim 8,
wherein the shaped region comprises a surface portion on which a heat transfer medium flowing past the system acts with fluid-dynamic turbulence.

10. The system as claimed in claim 1,
wherein the heat dissipating device comprises an electrically insulating layer at the outermost surface of the heat dissipating device.

11. A thermal module for storing and releasing electrical energy, comprising
multiple electrically interconnected systems as claimed in claim 1,
wherein the systems are surrounded by a heat transfer medium for heat transfer purposes.

12. A method for producing a system as claimed in claim 1, comprising:
bringing the electrochemical storage device into thermal contact with the heat dissipating device at a receiving portion.

13. The system as claimed in claim 1, wherein a distance between the solid electrolyte and the wall at the side part is smaller than the distance between the solid electrolyte and the wall at the top part.

14. The system as claimed in claim 1, wherein the receiving portion takes the form of a depression or recess so that the heat dissipation device and the electrochemical storage device are connected together by suitably shaped mating regions to form the thermal contact.

15. The system as claimed in claim 1, wherein the heat dissipating device is embodied in multiple pieces.

16. The system as claimed in claim 15, wherein at least one of the multiple pieces has a triangular basic shape.

17. The system as claimed in claim 1, wherein the second surface of the heat dissipating device comprises a shaped region that takes the form of a flow guided surface.

18. The system as claimed in claim 1, wherein the first surface of the heat dissipating device is adapted to be connected at least in part with an exact fit with the receiving portion of the electrochemical storage device.

* * * * *